US012624946B2

(12) United States Patent
Ichiriyama et al.

(10) Patent No.: US 12,624,946 B2
(45) Date of Patent: May 12, 2026

(54) SURVEYING ASSISTANCE DEVICE, SURVEYING ASSISTANCE SYSTEM, SURVEYING ASSISTANCE METHOD, AND STORAGE MEDIUM

(71) Applicant: TOPCON CORPORATION, Tokyo (JP)

(72) Inventors: Umihiro Ichiriyama, Tokyo (JP); Motohiro Miyajima, Tokyo (JP); Keisuke Nakamura, Tokyo (JP); Ryosuke Shimizu, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 643 days.

(21) Appl. No.: 18/101,517

(22) Filed: Jan. 25, 2023

(65) Prior Publication Data

US 2023/0168087 A1 Jun. 1, 2023

Related U.S. Application Data

(63) Continuation of application No. PCT/JP2021/028138, filed on Jul. 29, 2021.

(30) Foreign Application Priority Data

Jul. 31, 2020 (JP) ................................. 2020-130534

(51) Int. Cl.
*G01C 21/20* (2006.01)
*G01C 15/00* (2006.01)

(52) U.S. Cl.
CPC ........... *G01C 15/004* (2013.01); *G01C 21/20* (2013.01)

(58) Field of Classification Search
CPC .... G01C 21/20; G01C 21/3896; G01C 21/00; G01C 21/005; G01C 21/04; G01C 21/10;
(Continued)

(56) References Cited

U.S. PATENT DOCUMENTS

2023/0003527 A1 * 1/2023 Ichiriyama ........... G01C 21/005

FOREIGN PATENT DOCUMENTS

EP 1503176 A2 2/2005
EP 3978874 A1 * 4/2022 ............. G01C 15/00
(Continued)

OTHER PUBLICATIONS

Topkon Corporation, "Operation Manual for Data Collector FC-500 Kantoku-san. V", Observation, vol. 2, 2015, pp. 39-41, pp. 70-74; with English language translation.

*Primary Examiner* — Jeffrey P Aiello
(74) *Attorney, Agent, or Firm* — Studebaker Brackett PLLC

(57) ABSTRACT

A surveying assistance device is a computer configured to read design information including center point data of a center point set on a centerline of a route and constituent point data of constituent points set on a section including the center point, the section being orthogonal to the centerline, acquire position information indicating a current position of a surveyed device with a predetermined period, creates a plan view from the design information and display the plan view on a terminal screen unit, display the current position on the plan view and updates the display every time the position information is acquired, record the acquired position information in a storage as an observation data, and display reference lines indicating positions which are distant from the designated section backward and forward in a route direction by a preset distance limit on the plan view.

14 Claims, 13 Drawing Sheets

(58) Field of Classification Search
CPC .... G01C 21/26; G01C 21/38; G01C 21/3804;
G01C 21/3863; G01C 21/3885; G01C
15/002; G01C 15/004; G01C 15/06;
G01C 15/02; G01C 15/00; G01C 15/12;
G01C 17/00; G01C 22/00; G01C 23/00;
G01C 7/00; G01C 1/00; G06N 7/01;
G06N 20/00; G06N 3/02; G06F 17/18;
G06F 3/0346; G06F 3/0635; G06F 16/29;
G06F 16/2477; G06V 20/10
USPC ..... 73/1.75; 324/329, 323; 340/539.13, 540;
342/357.25, 104, 196; 700/83; 702/152,
702/188, 150, 5, 189, 94, 2, 85, 104, 16,
702/127, 1, 95; 703/1, 8, 6
See application file for complete search history.

(56) References Cited

FOREIGN PATENT DOCUMENTS

| JP | 2002174517 A | * | 6/2002 | ............. G01C 15/00 |
|----|--------------|---|--------|-------------------------|
| JP | 2006-003206 A | | 1/2006 | |
| JP | 2010085217 A | * | 4/2010 | ............. G01C 15/00 |
| JP | 2017151013 A | * | 8/2017 | ............. G01C 15/00 |
| JP | 6224659 B2 | | 11/2017 | |
| JP | 2019200128 A | * | 11/2019 | ............... G01C 7/02 |
| JP | 2021143929 A | * | 9/2021 | ............. G01C 15/00 |
| WO | WO-2021181928 A1 | * | 9/2021 | ............. G01C 15/00 |

* cited by examiner

SURVEYING ASSISTANCE DEVICE, SURVEYING ASSISTANCE SYSTEM, SURVEYING ASSISTANCE METHOD, AND STORAGE MEDIUM

CROSS-REFERENCE TO RELATED APPLICATION, BENEFIT CLAIM, AND INCORPORATION BY REFERENCE

This application is a continuation application of and claims benefit under 35 USC 120 and 365 (c) to copending International Application No. PCT/JP2021/028138, entitled "SURVEYING ASSISTANCE PROGRAM, SURVEYING ASSISTANCE DEVICE, SURVEYING ASSISTANCE METHOD, AND SURVEYING ASSISTANCE SYSTEM", filed 29 Jul. 2021, the content of which is incorporated herein in its entirety by reference.

TECHNICAL FIELD

The present invention relates to a surveying assistance device, a surveying assistance system, a surveying assistance method, and a storage medium.

BACKGROUND ART

In construction of a linear structure such as a route, a construction plan drawing is prepared, and a construction plan is drawn up while considering a volume of soil of cutting and banking. Route survey includes cross-sectional observation in which a height difference (vertical distance) between a point on a cross-section orthogonal to a route and a center point on the cross-section is surveyed and a shape of the cross-section is observed.

In route survey, in recent years, a method in which by using an electro-optical device such as a total station or a GNSS survey device, with a target or a GNSS receiver used as a surveyed device respectively, a worker holds the surveyed device, moves between observation points, and acquires necessary observation point data is used.

Further, in the method described above, a surveying assistance system for which design information including data of constituent points serving as the observation points is read by a mobile information processing device, and a plan view, a cross-sectional view, and numerical information are displayed on a display unit is proposed. (See Patent Literature 1, Non-Patent Literature 1, etc.)

CITATION LIST

Patent Literature

Patent Literature 1: Specification of Japanese Patent No. 6224659

Non-Patent Literature

Non-Patent Literature 1: Operation Manual for Data Collector FC-500 Kantoku-san. V, TOPKON CORPORATION, 2. Observation, p. 6-11, p. 42-51

SUMMARY OF INVENTION

Technical Problem

In cross-sectional observation, as a cross-section (cross-sectional line) set in design information is not actually indicated by a line, etc. at a site, a worker cannot recognize whether a position to be measured by himself/herself is on the set cross-section. Therefore, in a place where a gradient is steep in a route direction, there is sometimes a case where a critical height difference is caused by distance from a set section.

Specifically, at a site as illustrated in FIG. 1, in the vicinity of a section No. 0 set in a place where a gradient in the route direction is gradual, even when being distant from the section in the route direction slightly (for example, by an amount of a distance $d_1$), a vertical distance $d_2$ from a center point $CP_0$ to be measured does not differ greatly from a vertical distance $d_3$ to be measured originally. However, in a place where a gradient in the route direction is steep as in a section No. 2, even when a distance from the section No. 2 is the same distance $d_1$, a fatal error is generated between a vertical distance $d_4$ from a center point $CP_2$ to be measured and a vertical distance $d_5$ to be measured originally.

The present invention was made in view of the above circumstances, and an object thereof is to prevent a distance error from a section in cross-sectional observation by making a worker visually recognize distance from the section.

Solution to Problem

In order to achieve the object described above, a surveying assistance device according to an aspect of the present invention includes a screen, a control unit including at least a processor and a memory, and a storage. The processor is configured to read design information including center point data of a center point set on a centerline of a route and constituent point data of constituent points set on a section including the center point, the section being orthogonal to the centerline, acquire position information indicating a current position of a surveyed device with a predetermined period, create a plan view from the design information to display the plan view on the screen, display the current position of the surveyed device on the plan view and update the display of the current position every time the position information is acquired, record the acquired position information in the terminal storage as an observation value of a constituent point on a designated section; and display reference lines indicating positions which are distant from the designated section backward and forward in a route direction by a preset distance limit on the plan view.

In the aspect described above, it is also preferable that the processor is configured to calculate a distance between the current position of the surveyed device and the designated section based on the position information and the design information, compare the distance with the distance limit, and in a case where the distance exceeds the distance limit, issue a warning that the surveyed device is distant from the designated section while exceeding the distance limit.

Further, in the aspect described above, it is also preferable that the processor is configured to calculate a distance between the current position of the surveyed device and the designated section based on the position information and the design information, compare the distance with the distance limit, and in a case where the distance exceeds the distance limit, not store the position information in the storage as the observation data.

Further, in the aspect described above, it is also preferable that the processor is configured to calculate a distance between the current position of the surveyed device and the designated section based on the position information and the design information, calculate a direction in which the distance between the current position and the designated section approximates zero, and guide a worker in the direction in which the distance approximates zero.

Further, in the aspect described above, it is also preferable that the processor is configured to calculate a longitudinal gradient based on the design information, compare a preset longitudinal gradient threshold value and the calculated longitudinal gradient, and issue a warning in a case where the longitudinal gradient is larger than the threshold value.

A surveying assistance system according to another aspect of the present invention includes a position acquiring device that acquires the current position of the surveyed device and the surveying assistance device according to the aspect described above and the surveying assistance device is configured to capable of communicate with the position acquiring device to acquire the position information of the surveyed device.

Further, a surveying assistance method according to still another aspect of the present invention includes making a computer including a processor, a memory, a screen and a storage, read design information including center point data of a center point set on a centerline of a route, and constituent point data of constituent points set on a section including the center point, the section being orthogonal to the centerline, acquire position information indicating a current position of a surveyed device with a predetermined period, create a plan view from the design information and displaying the plan view on the screen of the computer, display the current position of the surveyed device on the plan view and updating a display of the current position every time the position information is acquired, record the acquired position information in the storage as observation data and display reference lines indicating position which are distant from the designated section backward and forward in a route direction by a preset distance limit on the plan view.

Further, a computer-readable storage medium according to still another aspect of the present invention includes a surveying assistance program to make a computer read design information including center point data of a center point set on a centerline of a route, and constituent point data of constituent points set on a cross-section including the center point, the cross-section being orthogonal to the centerline, acquire position information indicating a current position of a surveyed device with a predetermined period, create a plan view from the design information and display the plan view on a screen of the computer, display the current position on the plan view and update a display of the current position every time the position information is acquired and record the acquired position information in a storage of the computer as a measurement value of a point on a designated section. The surveying assistance program makes the computer display reference lines indicating positions which are distant from the designated section backward and forward in a route direction by a preset distance limit on the plan view displayed on the screen.

Benefits of Invention

With the surveying assistance device, the surveying assistance system, the surveying assistance method, and the storage medium according to the aspects described above, it is possible to prevent a distance error from a section in cross-sectional observation by making a worker visually recognize distance from the section.

DESCRIPTION OF EMBODIMENTS

Hereinafter, preferred embodiments of the present invention will be described with reference to the drawings, however, the present invention is not limited to these. In the embodiments, members having the same functions and configurations will be provided with the same reference signs, and overlapping description will be omitted as appropriate.

Embodiment (Design Information)

Prior to description of a configuration of a surveying assistance system (hereinafter, simply referred to as the "system") 100 according to the embodiment of the present invention, design information used in the present system will be described with reference to FIG. 2. The design information is, for example, information prepared with absolute coordinates, the information including a route blueprint required in work of a route, etc. The design information includes centerline data indicating a centerline CL of the route. The design information also includes center point data indicating center points $CP_0$, $CP_1$, $CP_2$, . . . set at predetermined intervals (for example, intervals of 20 m) on the centerline CL. The center points are points at which center stakes are installed in a site.

In the design information, cross-sections (hereinafter, simply referred to also as the "sections") No. 0, No. 1, No. 2, . . . respectively including the center points $CP_0$, $CP_1$, $CP_2$, . . . , the cross-sections being orthogonal to the centerline are set. On the sections, constituent points are set, for example, on the section No. 0, constituent points $P0_1$ to $P0_4$ are set. The constituent points are points at which stakes serving as marks in the site are installed like points that define a width of a road. For example, the constituent points $P0_1$, $P1_1$, $P2_1$, . . . are set at positions whose distances from the center points on the sections are equal along a route direction.

(Entire Configuration of System)

Figure 3:
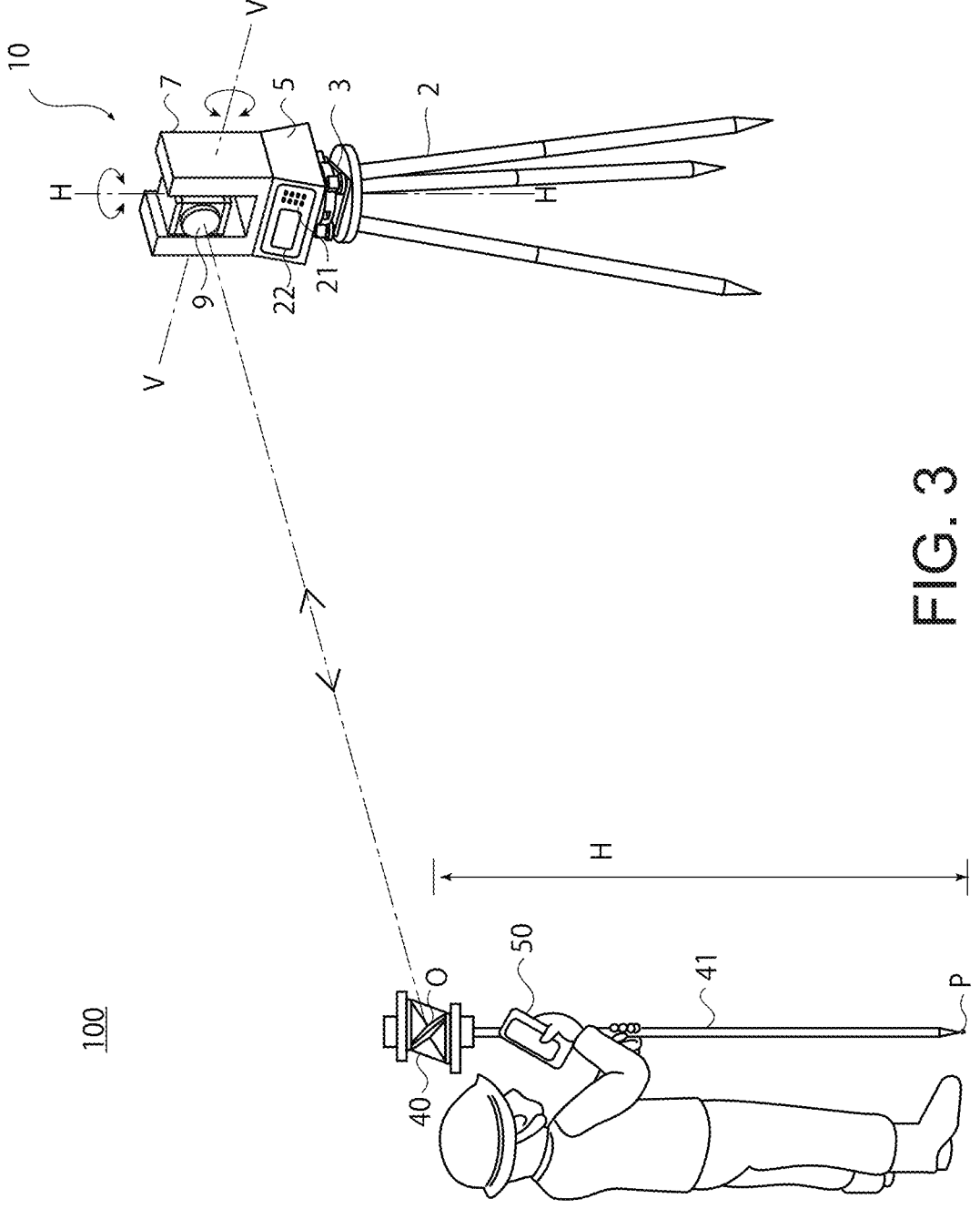
FIG. 3 is a schematic external appearance view of the same surveying assistance system.
Figure 4:
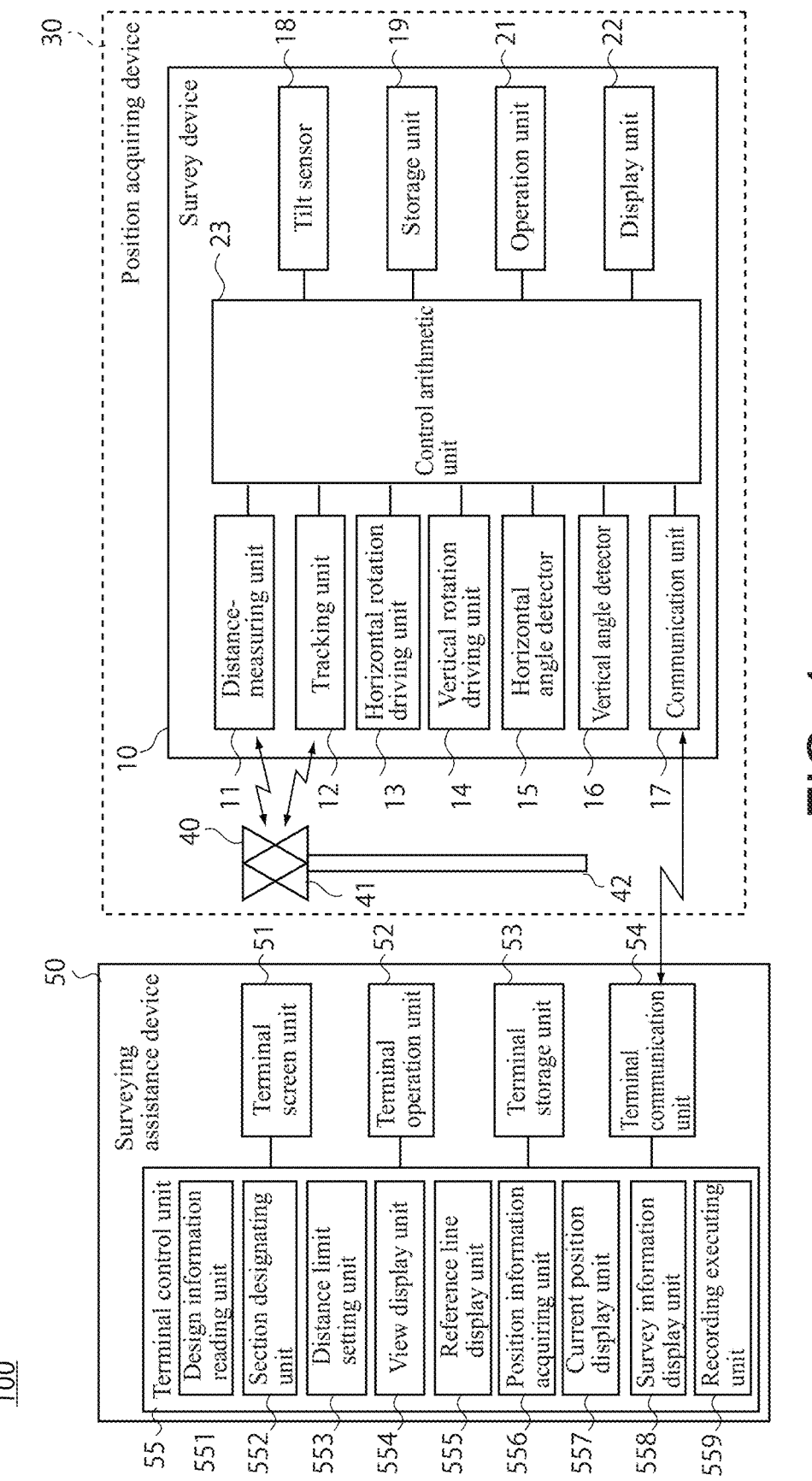
FIG. 4 is a configuration block diagram of the same surveying assistance system.

As illustrated in FIGS. 3 and 4, the system 100 includes a position acquiring device 30 and a surveying assistance device 50.

(Configuration of Position Acquiring Device 30)

The position acquiring device 30 includes a survey device 10 and a surveyed device 40. The survey device 10 is a total station (electronic distance-measuring and angle-measuring instrument). The survey device 10 is installed at a known point via a tripod 2. Alternatively, coordinates may be made known by, for example, a backward intersection method, or the like after the survey device 10 is installed. The known coordinate data of the survey device 10 is input into the surveying assistance device 50 in advance and stored in a terminal storage unit 53.

The survey device 10 has, in appearance, a base portion 5 provided on a leveling unit 3, a bracket portion 7 to be rotated horizontally about an axis H-H on the base portion 5, and a telescope 9 to be rotated vertically about an axis V-V in the bracket portion 7. A control arithmetic unit 23 to be described later is accommodated in the bracket portion 7.

The survey device 10 includes an automatic collimation function and an automatic tracking function, and a distance-measuring optical system and a tracking optical system (not illustrated) are accommodated in the telescope 9. Configurations of the distance-measuring optical system and the tracking optical system are conventionally publicly known. In the survey device 10, by cooperation of horizontal rotation of the bracket portion 7 and vertical rotation of the telescope 9, a distance-measuring light and a tracking light are irradiated over the entire circumference.

Figure 1:
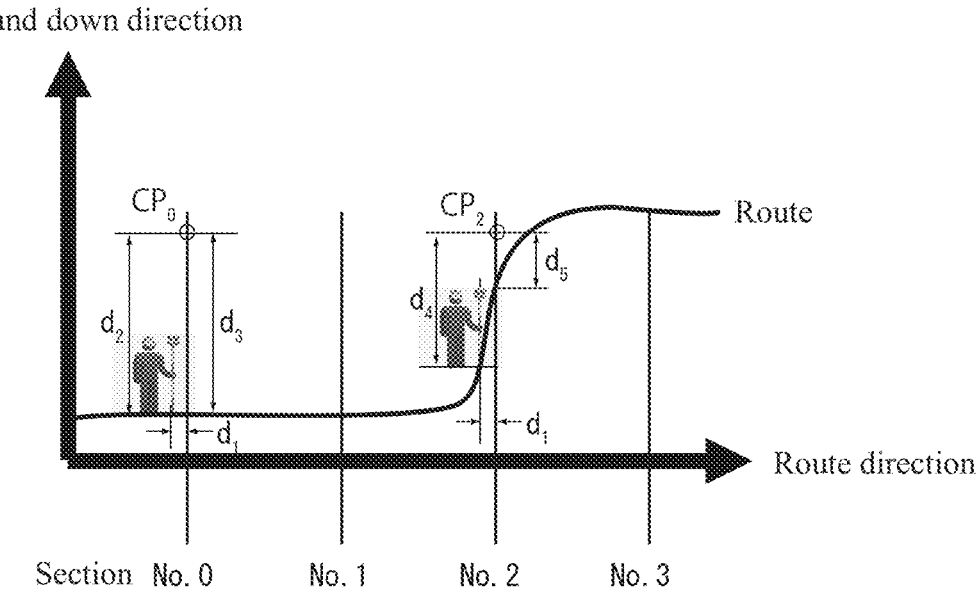
FIG. 1 is a view illustrating an error due to distance from a section in cross-sectional observation.
Figure 2:
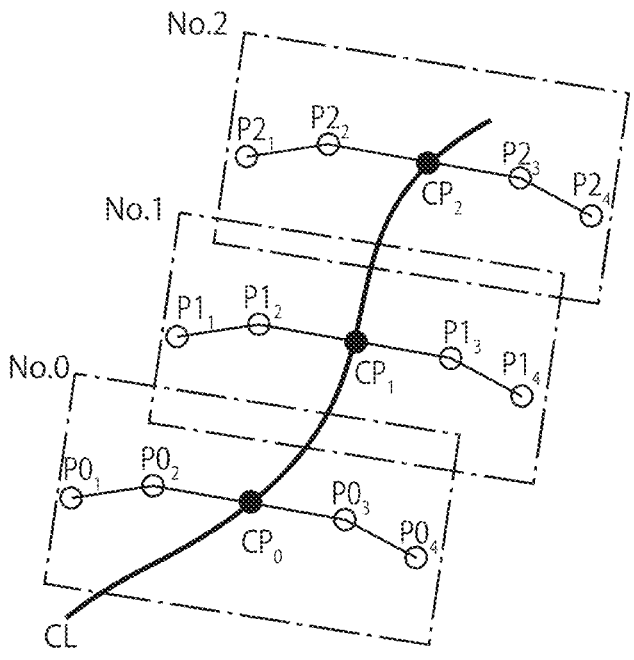
FIG. 2 is a view illustrating design information used in a surveying assistance system according to an embodiment.

As illustrated in FIG. 2, the survey device 10 includes a distance-measuring unit 11, a tracking unit 12, a horizontal rotation driving unit 13, a vertical rotation driving unit 14, a horizontal angle detector 15, a vertical angle detector 16, a communication unit 17, a tilt sensor 18, a storage unit 19, an operation unit 21, a display unit 22, and the control arithmetic unit 23.

The distance-measuring unit 11 emits a distance-measuring light by using the distance-measuring optical system, receives a reflected light from a target 41 provided in the surveyed device 40, and automatically collimates and measures a distance to the target 41.

The tracking unit 12 emits a tracking light by using the tracking optical system, captures a position of the target 41 from a reflected light from the target 41, and in a case where the target 41 is moved, automatically tracks the target 41.

The horizontal rotation driving unit 13 is a motor provided in the base portion 5. The horizontal rotation driving unit 13 rotates the bracket portion 7 about the axis H-H with respect to the base portion 5. The vertical rotation driving unit 14 is a motor provided in the bracket portion 7. The vertical rotation driving unit 14 rotates the telescope 9 about the axis V-V.

The horizontal angle detector 15 and the vertical angle detector 16 are rotary encoders. The horizontal angle detector 15 detects an angle of the bracket portion 7 about the axis H-H, and the vertical angle detector 16 detects an angle of the telescope 9 about the axis V-V. As a result, the horizontal angle detector 15 and the vertical angle detector 16 constitute an angle-measuring unit that measures an angle to the target 41.

The communication unit 17 is a communication control device that connects the survey device 10 and the surveying assistance device 50 by wire or wirelessly. As a communications standard to realize the communication unit 17, Wi-Fi (registered trademark) as one of wireless LAN standards or 4G (fourth-generation mobile communications system) may be adopted. Alternatively, a short-range wireless communications standard such as Bluetooth (registered trademark) and infrared communication may be adopted.

The tilt sensor 18 is a tilt sensor of a bubble tube type, a capacitance type, etc., and is fixed on an upper surface of a rotation shaft (not illustrated) of the base portion 5. A value of the tilt sensor 18 when a rotation shaft of the horizontal rotation driving unit 13 is once rotated forward and backward is read, and based on a gap amount of forward and backward rotations, horizontalness of the leveling unit 3 is adjusted.

The storage unit 19 is a storage medium that memorizes, stores, and transmits information in a form with which the control arithmetic unit 23 is capable of processing, and for example, an HDD (Hard Disc Drive), a flash memory, etc. is adopted. In the storage unit 19, the measured survey data and a program for various processing in the control arithmetic unit are stored.

The operation unit 21 is a plurality of buttons provided on an outer surface of the bracket portion 7. Various information relating to actions of the survey device 10 can be input via the operation unit 21.

The display unit 22 is a liquid crystal display provided on the outer surface of the bracket portion 7, and displays various information relating to surveying.

The control arithmetic unit 23 is a microcomputer for which a CPU (Central Processing Unit), a ROM (Read Only Memory), a RAM (Random Access Memory), etc. are mounted on an integrated circuit. The control arithmetic unit 23 is connected to the units of the survey device 10.

The control arithmetic unit 23 reads the program for executing various functions of the survey device 10 from the storage unit 19 or the RAM and controls the units of the survey device 10 to execute various functions such as automatic tracking, distance measurement and angle measurement. The control arithmetic unit 23 also performs arithmetic processing on data obtained by distance measurement and angle measurement, and acquires position information (position coordinates) of the target 41.

Further, the control arithmetic unit 23 communicates with the surveying assistance device 50 via the communication unit 17, executes measurement following an order of the surveying assistance device 50, and sends survey data of the surveyed device 40 to the surveying assistance device 50.

The surveyed device 40 includes the target 41 and a pole-shaped support member 42 that supports the target 41.

The target 41 is a so-called 360-degree prism configured by radially combining a plurality of triangular-pyramid-shaped prisms. However, the target 41 is not limited to this. The target 41 retro-reflects incident light in a direction opposite to an incident direction.

In the support member 42, a length H from a leading end to the center O of the target 41 is known. The support member 42 includes a level (not illustrated), and can be installed vertically. By subtracting the length H of the support member 42 from three-dimensional coordinates of the center O determined from distance measurement and angle measurement data which is obtained by measuring the distance and the angle to the target 41 installed vertically at an observation point P via the support member 42 by the survey device 10 installed at the known point, it is possible to determine three-dimensional coordinates of the observation point P as the position information of the surveyed device 40.

As another working example of the position acquiring device 30, it is possible to use a GNSS survey device. In this case, by using a GNSS receiving device capable of communicating with the surveying assistance device 50 as the surveyed device 40, a current position of the surveyed device 40 is surveyed.

(Configuration of Surveying Assistance Device)

The surveying assistance device 50 is a portable information processing device capable of communicating with the position acquiring device 30. The surveying assistance device 50 may be realized by a mobile computer terminal such as a mobile phone, a smartphone, a tablet computer, a PDA, or a data collector.

The surveying assistance device 50 includes a terminal screen unit 51, a terminal operation unit 52, the terminal storage unit 53, a terminal communication unit 54, and a terminal control unit 55.

The terminal screen unit 51 is, for example, a touch-panel type liquid crystal display integrated with the terminal operation unit 52. The terminal screen unit 51 displays images according to a processing content such as an observation screen 60, a section designating screen 90, or a distance limit setting screen 80.

The terminal storage unit 53 is a storage medium in which various programs and various data are stored in a readable and writable manner. The terminal storage unit 53 is, for example, an HDD. The terminal storage unit 53 may be, for example, an optical disc drive such as a CD (Compact Disc) drive. The terminal storage unit 53 stores a communication program, an image display program for displaying a work content, etc. and a communication content, etc. on the terminal screen unit 51, various programs for executing cross-sectional observation, etc.

Further, the terminal storage unit 53 also stores initial setting information such as coordinates of the survey device 10 and a height H of the target 41, and the design information. The terminal storage unit 53 also stores surveying data of the target 41 received from the survey device 10 and measurement value data in cross-sectional observation.

The terminal communication unit 54 is a communication control device capable of communicating with the survey device 10 via the communication unit 17 of the survey device 10, and has the same communications standard as the communication unit 17.

The terminal control unit 55 is a control unit including at least a CPU and memories (ROM, RAM), etc. The terminal control unit 55 controls the surveying assistance device 50 and the survey device 10 based on an input signal from the terminal communication unit 54, the terminal operation unit 52, etc. The terminal control unit 55 calls a program stored in the terminal storage unit 53 to the memory to execute it.

The terminal control unit 55 includes a design information reading unit 551, a section designating unit 552, a distance limit setting unit 553, a view display unit 554, a reference line display unit 555, a position information acquiring unit 556, a current position display unit 557, a survey information display unit 558, and a recording executing unit 559 as functional units.

The design information reading unit 551 reads the design information stored in the terminal storage unit 53. Alternatively, the design information reading unit 551 may receive and read design information stored in an external storage via the terminal communication unit 54.

The section designating unit 552 designates a section of an observation object from the sections set in the design information following an input of a worker. The section of the observation object is a section including a center point serving as a reference to which vertical and horizontal distances are to be calculated and will be hereinafter referred to as the "designated section".

The distance limit setting unit 553 sets a distance limit LD of backward and forward distance from the designated section following an input of the worker.

Figure 5:
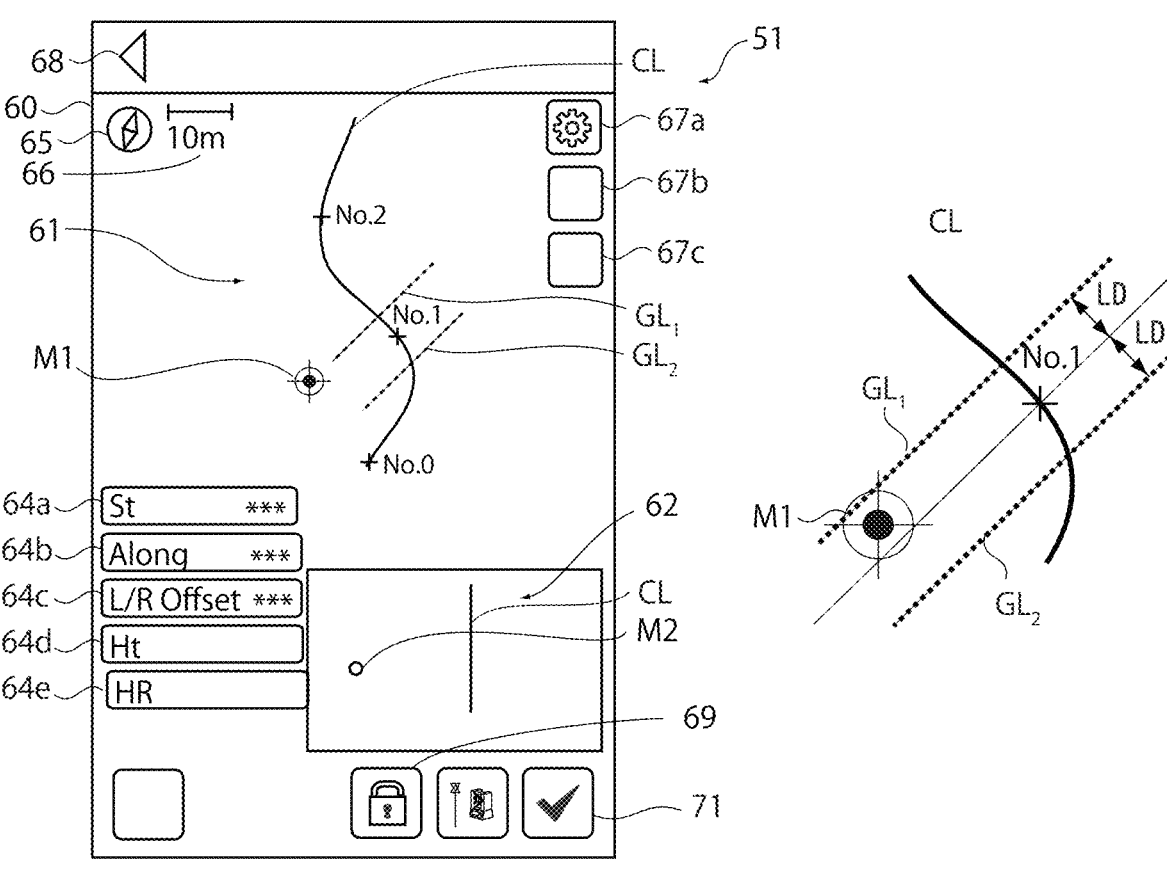
FIG. 5 is a view illustrating an example of an observation screen displayed on a terminal screen unit of a surveying assistance device of the same embodiment.

The view display unit 554 creates a plan view 61 in which the centerline CL of the route is projected on a horizontal plane from the design information, and displays it on the observation screen 60 (FIG. 5). The view display unit 554 also creates a cross-sectional view 62 indicating the centerline CL in the designated section from the sections set in the design information, and displays it on the observation screen 60 of the terminal screen unit 51 (FIG. 5).

As described later, the reference line display unit 555 creates reference lines $GL_1$, $GL_2$ which are separate from the designated section in backward and forward in the route direction by the distance limit LD set by the distance limit setting unit 553 on the plan view and displays them over the plan view 61.

The position information acquiring unit 556 receives measurement data of the target 41 measured by the survey device 10 with a predetermined period via the terminal communication unit 54 upon each measurement. The position information acquiring unit 556 acquires position coordinates of the surveyed device 40 in an absolute coordinate system as the position information of the surveyed device 40 based on coordinates of the survey device 10 and the height H of the target stored in the terminal storage unit 53.

Based on the position information of the surveyed device 40 acquired by the position information acquiring unit 556, the current position display unit 557 displays a marking M1 indicating the current position of the surveyed device 40 on the plan view and updates the display every time the position information is acquired. The current position display unit 557 also displays a marking M2 on the cross-sectional view and updates the display every time the position information is acquired.

The survey information display unit 558 calculates a distance of the surveyed device 40 from the designated section, and the horizontal distance and the vertical distance from the center point on the designated section to the current position of the surveyed device 40 based on the position information, and displays them on the observation screen 60 as survey information (FIG. 5). The survey information may also include various information relating to cross-sectional observation such as the number of a designated section (center point). The survey information display unit 558 may also update the display of the survey information every time the position information is acquired.

Following a command from the worker, the recording executing unit 559 stores the survey information at the current position of the surveyed device 40 in the terminal storage unit 53 as observation data.

Functions of the functional units may be realized by a circuit, or may be realized by executing a program. In a case where the functions are realized by a program, the program may be stored in a computer-readable storage medium such as a magnetic disk, a flexible disc, an optical disc, a compact disc, a Blu-ray (registered trademark) disc, and a DVD.

(Observation Screen)

Next, the observation screen 60 will be described again. As illustrated in FIG. 5, on the observation screen 60, the plan view 61 and the cross-sectional view 62 created by the view display unit 554 are displayed side by side.

Further, in the plan view 61, the marking M1 indicating the position of the surveyed device 40 is displayed. In the cross-sectional view 62, the marking M2 indicating the position of the surveyed device 40 is displayed.

As enlarged and illustrated in a right part of FIG. 5, on the plan view 61, the reference lines $GL_1$, $GL_2$ indicating positions which are separate from the designated section respectively forward and backward in the route direction by the distance limit LD are displayed.

Further, on the observation screen 60, survey information displays 64a to 64e which are displayed by the survey information display unit 558 are displayed. The survey information displays 64a to 64e indicate, for example, the number of a designated section (center stake) (64a), a horizontal distance of the surveyed device 40 from the designated section in the backward and forward direction of the route (64b), a horizontal distance of the surveyed device 40 from a designated center point in a left or right direction orthogonal to the backward and forward direction of the route (64c), a vertical distance of the surveyed device 40 from the designated center stake (64d), etc.

Further, on the observation screen 60, an orientation mark 65 indicating north, south, east, and west of the plan view 61, and a map scale 66 indicating scale may be displayed. Further, on the observation screen 60, functional icons 67a, 67b, 67c, . . . for aiding a surveying work, including a functional icon 67a for calling the distance limit setting screen 80 may be displayed. A screen shift button 68 for shifting to the section designating screen 90 for selecting the designated section as initial setting is also displayed.

Further, on the observation screen 60, an observation start button 69 for ordering the survey device 10 to start and stop tracking and observation of the surveyed device 40, and a recording button 71 for recording the observation data are displayed.

In addition, the plan view 61 and the cross-sectional view 62 can accept arbitrarily zooming. It is possible to change a position of the cross-sectional view 62 relative to the plan view 61 which is displayed on the terminal screen unit 51 at the same time in response to a command of the terminal operation unit 52, and specifically to change the position freely in a frame by a touch panel operation. It is also possible to switch display/non-display of the cross-sectional view 62.

(Surveying Assistance Method)

Figure 6:
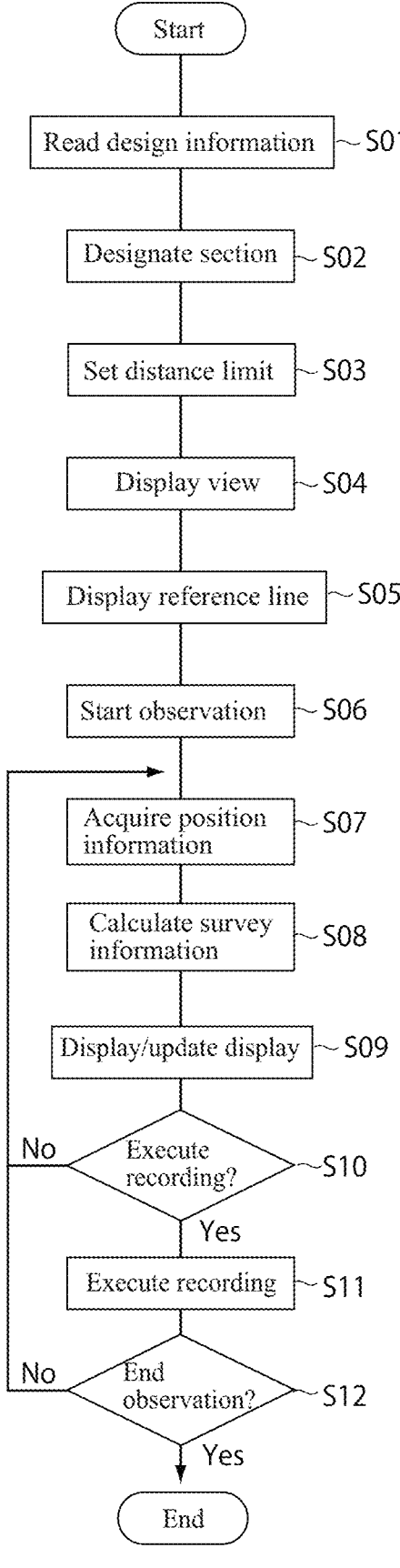
FIG. 6 is a flowchart illustrating an example of a surveying assistance method using the same surveying assistance system.

FIG. 6 is a flowchart illustrating processing of an example of a surveying assistance method for assisting cross-sectional observation using the surveying assistance device 50 of the present embodiment.

The survey device 10 is installed at the known point and in a state of being capable of automatically tracking the target 41. The worker holds the surveying assistance device 50 while vertically keeping the surveyed device 40, and successively performs observation at points corresponding to the constituent points while walking in the vicinity of the designed section of a survey site.

When processing is started, in Step S01, the design information reading unit 551 reads the design information.

Next, in Step S02, the section designating unit 552 selects a section of the observation object following a designation of the worker.

Figures 7A, 7B, 7C:
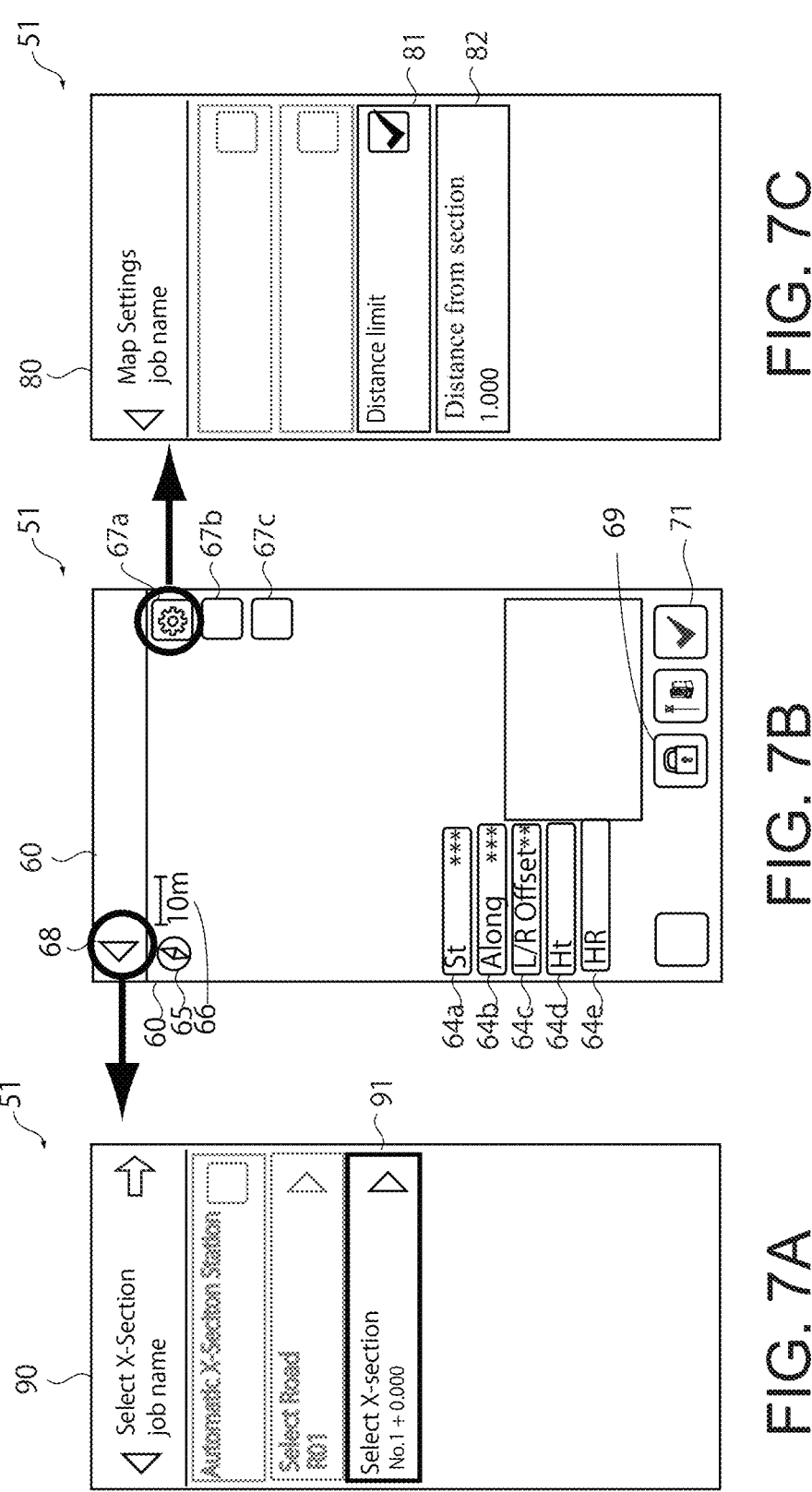
FIGS. 7A to 7C are views illustrating examples of a screen displayed on the terminal screen unit of the surveying assistance device of the same embodiment.

FIG. 7A illustrates an example of the section designating screen 90 to be shifted to by tapping the screen shift button 68 from the observation screen 60 illustrated in FIG. 7B. By selecting a section via a section designation button 91, designation of the designated section is enabled.

Next, in Step S03, the distance limit setting unit 553 sets whether a distance limit is set and how far the distance limit is set, following an input of the worker. the distance limit setting unit 553 sets whether a distance limit is set and how far the distance limit is set, following an input of the worker.

FIG. 7C illustrates an example of the distance limit setting screen 80 to be shifted to by tapping a screen setting button from the observation screen 60. Then, by turning a distance limit setting 81 ON by ticking off, and setting the distance limit LD from a distance limit setting 82, it is possible to set the distance limit.

Next, in Step S04, the view display unit 554 displays the plan view 61 created and the cross-sectional view 62 created on the observation screen 60 of the terminal screen unit 51.

At the same time, in Step S05, the reference line display unit 555 displays the reference lines $GL_1$, $GL_2$ on the plan view 61.

Next, in Step S06, when the worker taps the observation start button 69 and thereby starts observation, the survey device 10 measures the surveyed device 40 at predetermined intervals, and sends measurement data to the surveying assistance device 50 upon each measurement.

Next, in Step S07, the position information acquiring unit 556 receives the measurement data and acquires the position information of the current position of the surveyed device 40.

At the same time, in Step S08, the survey information display unit 558 calculates the survey information based on the position information.

Next, in Step S09, the current position display unit 557 displays the making M1 indicating the current position of the surveyed device 40 on the plan view 61 of the observation screen 60, and the survey information display unit 558 displays the survey information. In a case where the view display unit 554 displays the cross-sectional view 62, the current position display unit 557 may display the marking M2 indicating the current position of the surveyed device 40 on the cross-sectional view 62.

In a case where there is no command to execute recording by the worker (No) in Step S10, Steps S07 to S10 are repeated, the survey information is calculated every time the position information is acquired, and the displays of the markings M1 and M2 and the survey information are updated.

Then, when the worker taps the recording button 71 and thereby execution of recording is commanded (Yes) in Step S10, in Step S11, the recording executing unit 559 records the position information and the survey information at that time point in the terminal storage unit 53 as the observation data.

Next, Steps S07 to S12 are repeated until an operation to end observation is performed by the worker in Step S12, and in a case where a command to end observation is issued by the worker (Yes), observation is ended.

In this way, in the present embodiment, a configuration is provided such that an allowable separation distance from the designated section in the front and rear direction is displayed as the reference lines on the plan view 61 of the observation screen 60 displayed on the terminal screen unit 51. Thus, the worker can execute cross-sectional observation within an allowable range while visually confirming a positional relationship with the current position of the surveyed device 40 which is held by the worker and displayed on the observation screen 60 at the same time. As a result, it is possible to prevent an error of an observation value caused by becoming distant from the section.

It is also possible to confirm to what extent the current position is separate from the section by a display of numerical values of a survey related information display. However, since the worker proceeds with observation while holding the surveying assistance device 50 and walking around the survey site, it is difficult to pay attention to distance from the section while always confirming the numerical values. In the present embodiment, the distance is displayed on the plan view as the reference lines. Thus, the worker is able to intuitively grasp the positional relationship between the reference lines and the current position, and efficiently proceed with an observation work.

Modified Example 1

Figure 8:
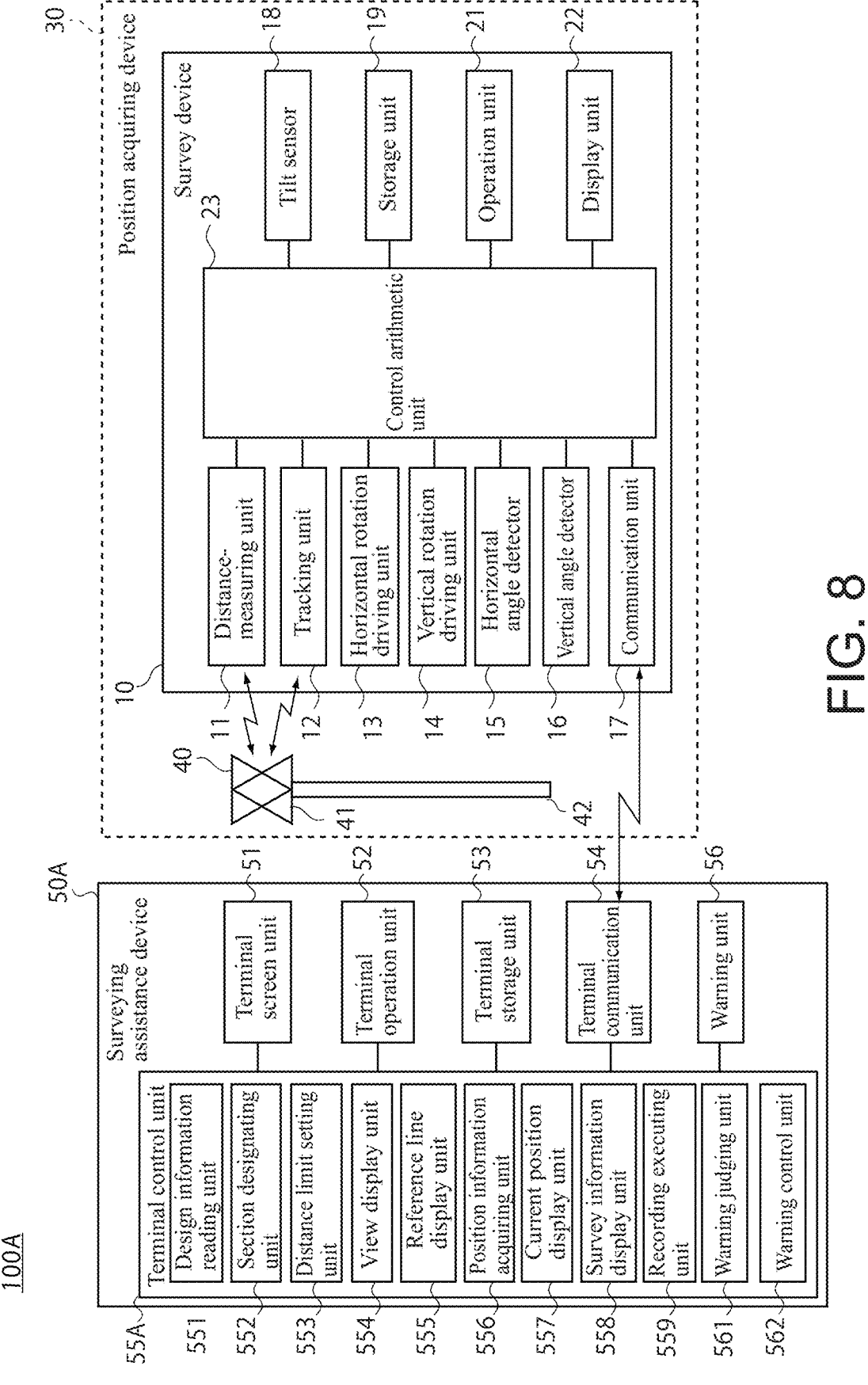
FIG. 8 is a configuration block diagram of a surveying assistance system according to a modified example of the present embodiment.

As illustrated in FIG. 8, a surveying assistance system 100A according to a modified example of the present embodiment has substantially the same configuration as the system 100. However, a surveying assistance device 50A further includes a warning judging unit 561, a warning control unit 562, and a warning unit 56.

The warning judging unit 561 compares a distance between the designated section and the current position of the surveyed device 40 and the set distance limit, and when the separation distance exceeds the distance limit, judges that a warning is required. Note that a distance that is obtained by drawing a perpendicular from the current position of the surveyed device 40 onto the designated section is taken as the distance between the designated section and the current position of the surveyed device 40.

When the warning judging unit 561 judges that a warning is required, the warning control unit 562 controls the warning unit 56 to cause it to execute a warning.

The warning unit 56 executes a warning action in accordance with control of the warning control unit 562. The warning unit 56 can be realized by an oscillation generating device such as an eccentric-mass type shaking device or a speaker that issues voice and sound, and may be realized by combination of these.

Figure 10:
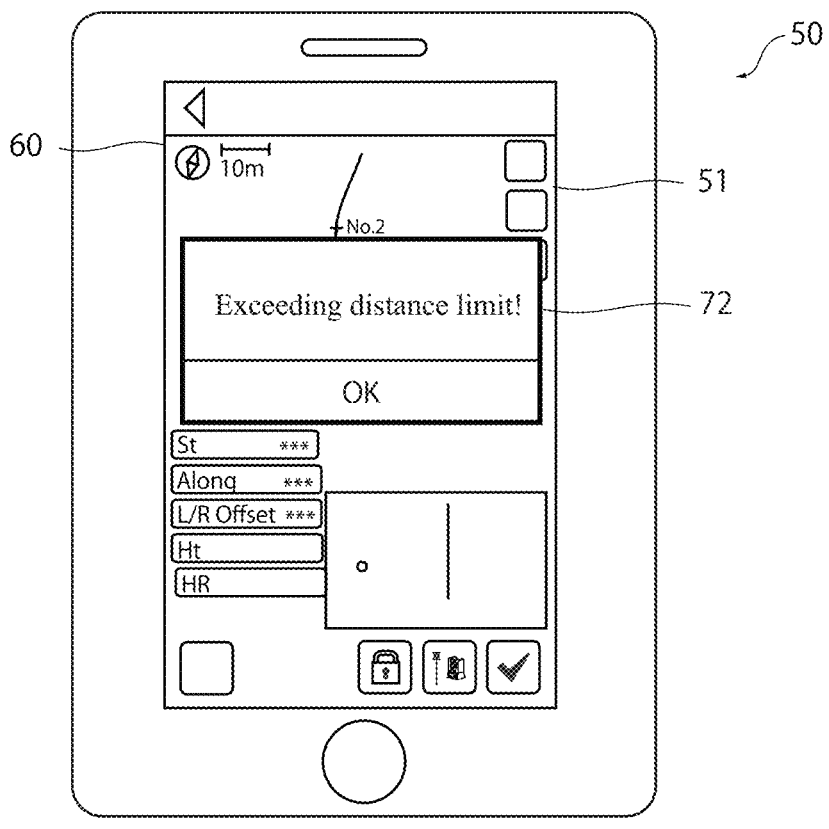
FIG. 10 is a view illustrating an example of a warning display displayed on the terminal screen unit of the surveying assistance device in the same surveying assistance system.

In a case where the warning unit 56 is an oscillation generating device, a warning is executed by generating oscillation and oscillating the surveying assistance device 50. In a case where the warning unit 56 is a speaker, a warning is executed by issuing a warning sound such as a beep sound or a warning by voice and sound. Alternatively, in a case where the warning unit 56 is the terminal screen unit 51, as illustrated in FIG. 10, a warning is executed by performing a warning display 72. The warning display is not limited to such a text display but may be performed by changing coloring of the observation screen 60, making blinking display, etc.

Figure 9:
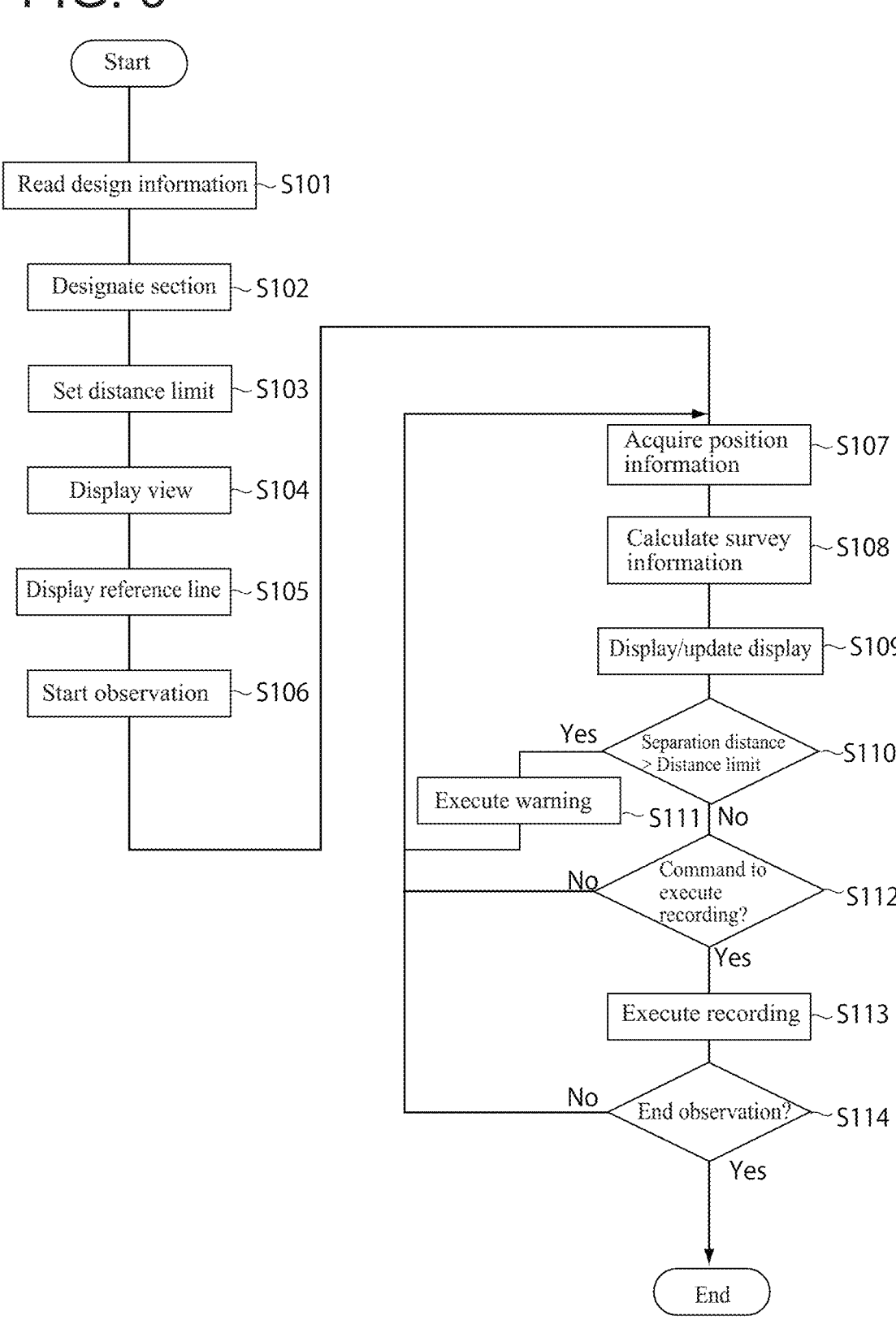
FIG. 9 is a flowchart illustrating an example of a surveying assistance method using the same surveying assistance system.

In a surveying assistance method of the system 100A, as illustrated in FIG. 9, when processing is started, in Steps S101 to S109, the same processing as Steps S01 to S09 is executed.

Next, in Step S110, the warning judging unit 561 compares the separation distance between the designated section and the current position of the surveyed device 40 and the set distance limit, and when the separation distance exceeds the distance limit, judges that a warning is required.

In a case where it is judged that a warning is required (Yes), in Step S111, the warning control unit 562 controls the warning unit 56 to execute a warning, and returns to Step S107 and repeats Steps S107 to S110. In a case where the distance continuously exceeds the distance limit, the surveying assistance device 50 continues to issue a warning. Thus, the worker naturally moves so as not to be warned, that is, into a range of the distance limit. Therefore, it is possible to prevent recording of a value at a position exceeding the distance limit.

This allows the worker to more clearly grasp the fact of deviating from the distance limit. Since the worker moves so as not to be warned, it is possible to reliably prevent recording of an erroneous measurement value.

Then, in Steps S112, to S114, the observation data is recorded in the same manner as in Steps S10 to S12, and observation is ended.

In the present modified example, the surveying assistance device 50 is configured to issue a warning to the worker in a case where the separation distance exceeds the distance limit. Thus, it is possible to further reliably prevent observation from being performed at distance from the section.

Modified Example 2

Figure 11:
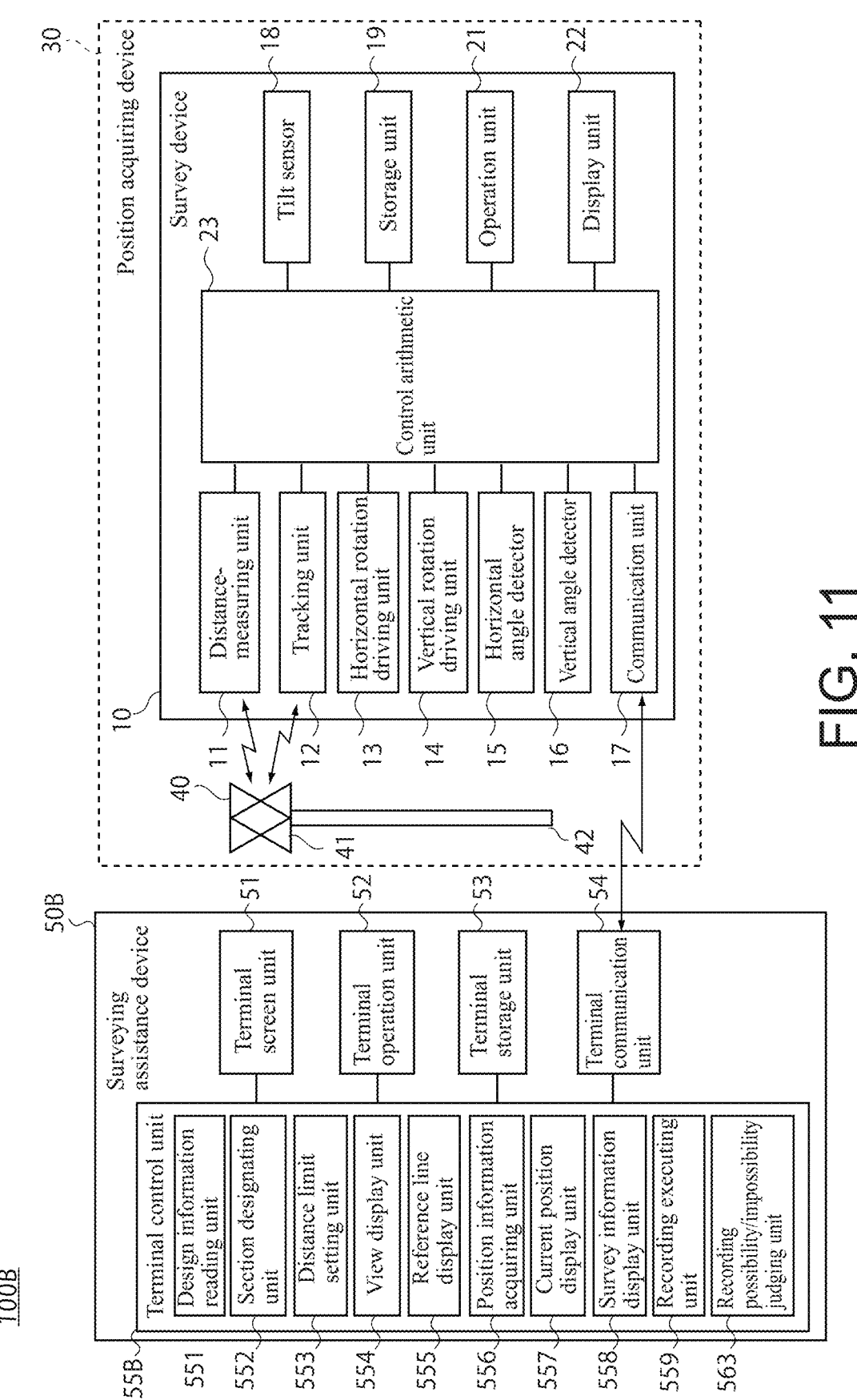
FIG. 11 is a configuration block diagram of a surveying assistance system according to another modified example of the present embodiment.

As illustrated in FIG. 11, a surveying assistance system 100B according to another modified example of the present embodiment has substantially the same configuration as the system 100. However, a surveying assistance device 50B further includes a recording possibility/impossibility judging unit 563.

The recording possibility/impossibility judging unit 563 compares the separation distance between the designated section and the current position of the surveyed device 40 and the distance limit set, and when the separation distance exceeds the distance limit, judges that recording is impossible and locks the recording button.

Actions of the system 100B in the surveying assistance method are substantially the same as the actions of the system 100A. However, in Step S110, instead of the warning judging unit 561 judging requirement of a warning, the recording possibility/impossibility judging unit 563 compares the separation distance between the designated section and the current position of the surveyed device 40 and the distance limit set, and judges whether or not the separation distance exceeds the distance limit.

Then, in a case where the separation distance exceeds the distance limit (Yes), in Step S111, instead of the warning control unit 562 controlling the warning unit 56 to execute a warning, the recording possibility/impossibility judging unit 563 locks the recording button so that recording cannot be performed even upon tapping. These are the different points.

In the present modified example, the surveying assistance device 50 is configured not to record an observation value in a case where the separation distance exceeds the distance limit. Thus, it is possible to further reliably prevent an observation value at a point distant from the designated section from being recorded.

Modified Example 3

Figure 12:
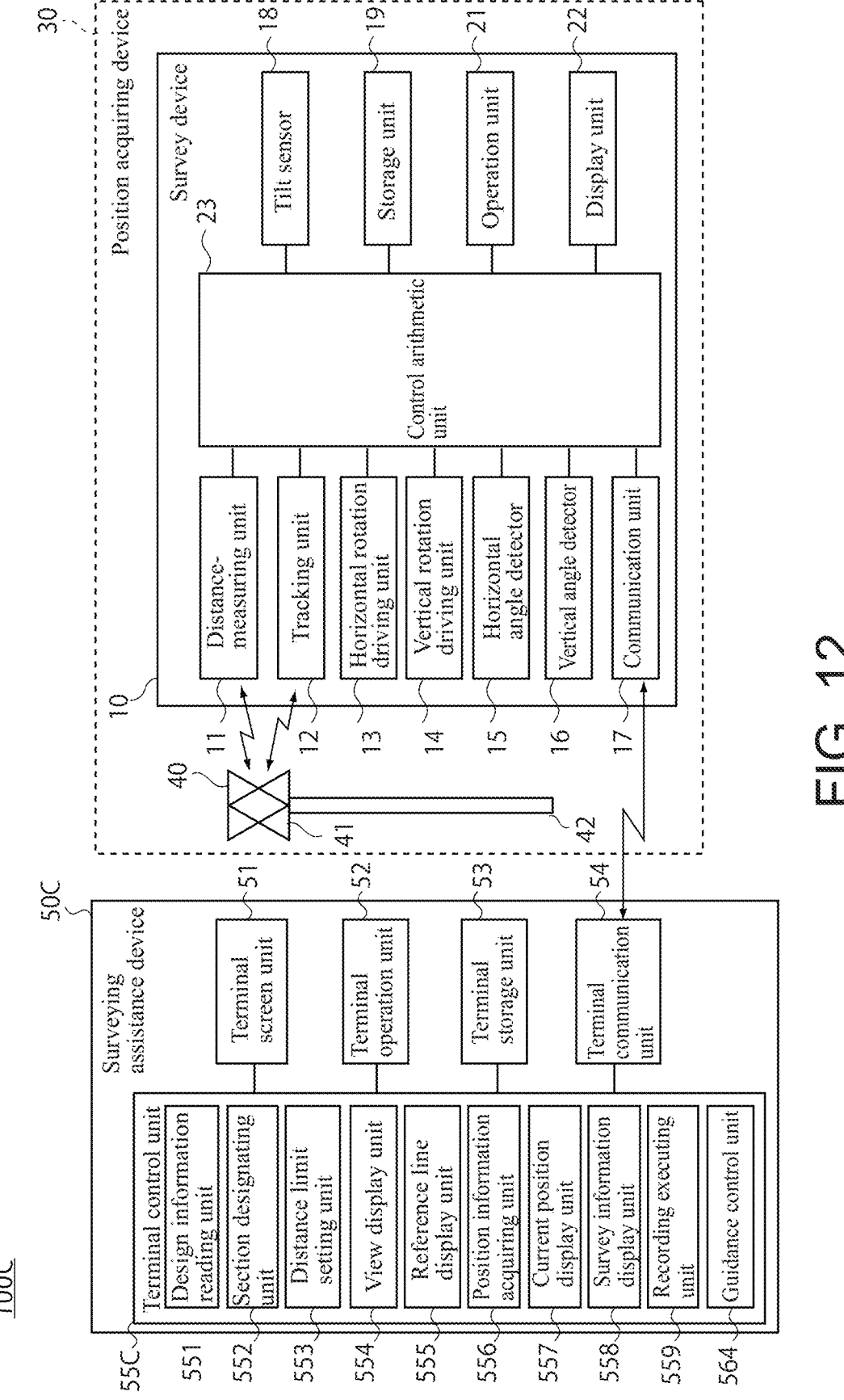
FIG. 12 is a configuration block diagram of a surveying assistance system according to still another modified example of the present embodiment.

As illustrated in FIG. 12, a surveying assistance system 100C according to still another modified example of the present embodiment has substantially the same configuration as the system 100. However, a surveying assistance device 50C further includes a guidance control unit 564.

Every time the position information acquiring unit 556 acquires the position information, the guidance control unit 564 calculates the distance between the surveyed device 40 and the designated section, calculates a direction in which the distance approximates zero, and displays a guidance display that guides the worker in the direction in which the distance approximates zero on a plan view.

Figure 13:
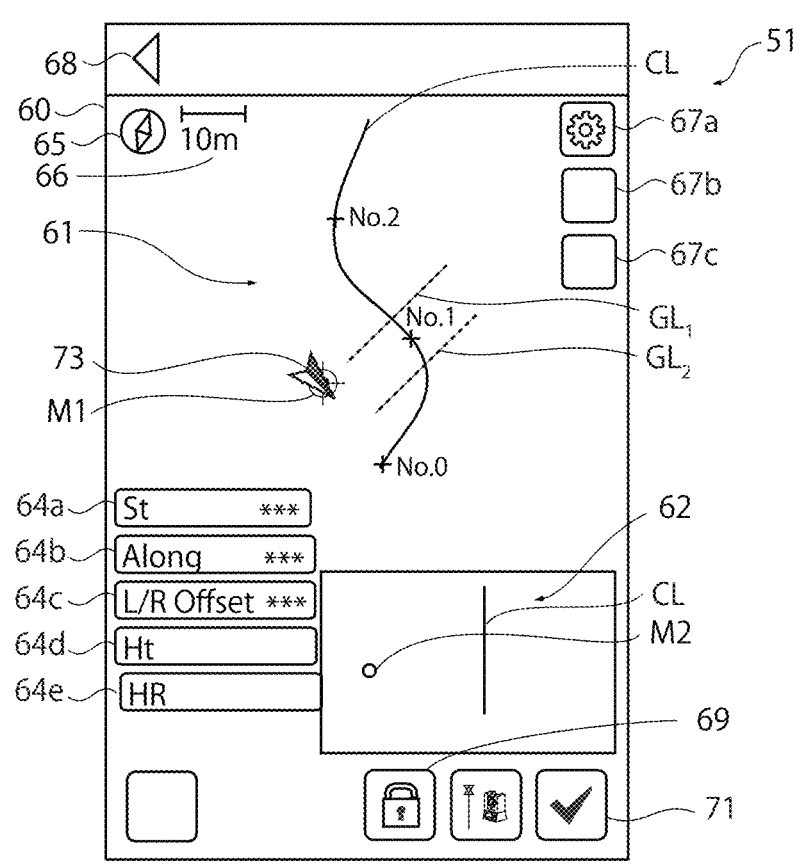
FIG. 13 is a view illustrating an example of guidance display displayed on the terminal screen unit of the surveying assistance device in the same surveying assistance system.

FIG. 13 illustrates an example of the guidance display, and illustrates a direction in which the worker has to move by an arrow 73 so that the worker moves in a direction not to be away from the section. For this, the surveying assistance device 50 may include an electronic compass.

With the configuration described above, the worker can always move so as not to be distant from the designated section. Thus, the worker can perform cross-sectional observation without being distant from the designated section.

Modified Example 4

Figure 14:
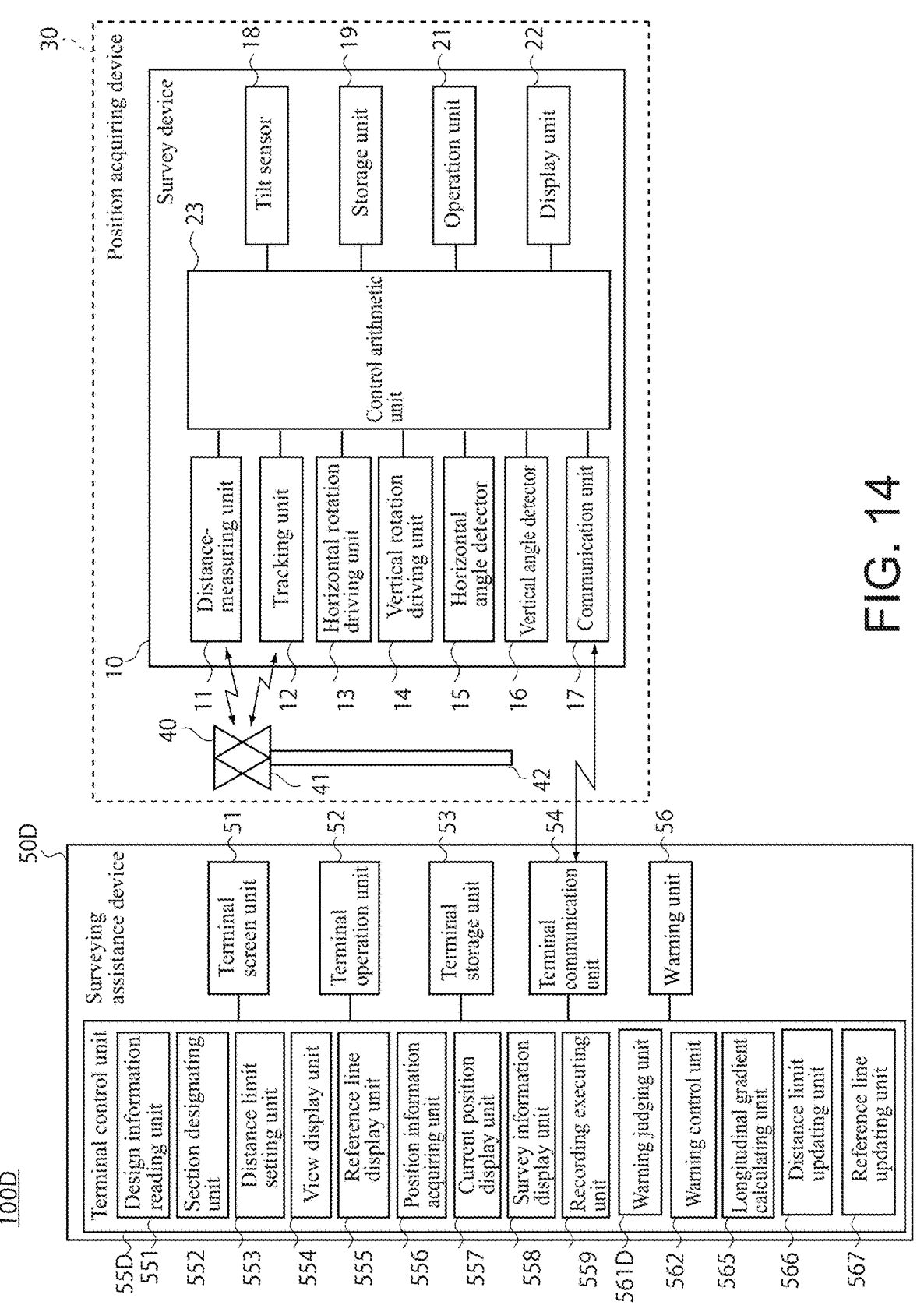
FIG. 14 is a configuration block diagram of a surveying assistance system according to yet another modified example of the present embodiment.

Further, as Modified Example 4, a configuration can also be provided such as a surveying assistance system 100D illustrated in FIG. 14. The system 100D has substantially the same configuration as the system 100A. However, a surveying assistance device 50D further includes a longitudinal gradient calculating unit 565, a distance limit updating unit 566, and a reference line updating unit 567 as functional units. In addition, the surveying assistance device 50D includes a warning judging unit 561D in place of the warning judging unit 561.

The longitudinal gradient calculating unit 565 calculates a longitudinal gradient of the current position of the surveyed device 40 based on the position information of the current position of the surveyed device 40 acquired by the position information acquiring unit 556 and the design information. The longitudinal gradient is determined by calculating a gradient of a plane in the design information where the current position is placed, defined by four constituent points which surround the current position of the surveyed device 40, for example.

The warning judging unit 561D compares a gradient threshold value and the longitudinal gradient, and when the longitudinal gradient exceeds the gradient threshold value, judges that a warning is required.

In a case where the warning judging unit 561D compares the gradient threshold value and the longitudinal gradient and judges that a warning is required when the longitudinal gradient exceeds the gradient threshold value, by the warning control unit 562, the warning unit 56 is controlled and a warning is executed. Note that the gradient threshold value is a threshold value of a gradient within a range in which separation in distance is allowed, and may be determined in advance and stored in the terminal storage unit 53. By configuring as above, the worker can perform a work while paying attention to a state where the gradient is large and an error due to separation in distance tends to be large.

Further, the distance limit updating unit 566 updates setting of the distance limit to a distance limit according to the longitudinal gradient. The distance limit according to the longitudinal gradient may be stored in the terminal storage unit 53 in a form of a table, etc., and the distance limit updating unit 566 may refer to this and set the distance limit. The reference line updating unit 567 creates reference lines separating from the designated section backward and forward in the route direction by the distance limit updated by the distance limit updating unit 566 and displays them on the observation screen 60 on the plan view. By configuring as above, it is possible to display accurate reference lines according to the gradient.

Another Modified Example

As another modified example, in initial setting, the worker does not set a designated section by an input but among the sections set in the design information, a section whose distance to the current position of the surveyed device 40 is the shortest may be automatically designated.

REFERENCE SIGNS LIST

10: Survey device
30: Position acquiring device
40: Surveyed device
50: Surveying assistance device
50A: Surveying assistance device
50B: Surveying assistance device
50C: Surveying assistance device
51: Terminal screen unit (screen)
53: Terminal storage unit (storage)
55: Terminal control unit
56: Warning unit
61: Plan view
82: Distance limit setting
100A: Surveying assistance system
100B: Surveying assistance system
100C: Surveying assistance system
551: Design information reading unit
552: Section designating unit
553: Distance limit setting unit
554: View display unit
555: Reference line display unit
556: Position information acquiring unit
557: Current position display unit
559: Recording executing unit
561: Warning judging unit
562: Warning control unit
563: Recording possibility/impossibility judging unit
564: Guidance control unit
$GL_1$, $GL_2$: Reference line

The invention claimed is:

1. A surveying assistance device comprising:
a screen;
a control unit including at least a processor and a memory; and
a storage,
wherein the processor is configured to
read design information including center point data of a center point set on a centerline of a route and constituent point data of constituent points set on a section including the center point, the section being orthogonal to the centerline,
acquire position information indicating a current position of a surveyed device with a predetermined period,
create a plan view from the design information to display the plan view on the screen,
display the current position of the surveyed device on the plan view and update the display of the current position every time the position information is acquired,
record acquired position information in the storage as an observation value of a constituent point on a designated section; and display a reference line indicating a position that is distant from the designated section backward or forward in a route direction by a preset distance limit on the plan view.

2. The surveying assistance device according to claim 1, wherein the processor is configured to calculate a distance between the current position of the surveyed device and the designated section based on the position information and the design information;

compare the distance with the distance limit; and in a case where the distance exceeds the distance limit, issue a warning that the surveyed device is distant from the designated section while exceeding the distance limit.

3. The surveying assistance device according to claim 1, wherein the processor is configured to calculate a distance between the current position of the surveyed device and the designated section based on the position information and the design information, compare the distance with the distance limit, and in a case where the distance exceeds the distance limit, not store the position information in the storage as the observation data.

4. The surveying assistance device according to claim 1, wherein the processor is configured to calculate a distance between the current position of the surveyed device and the designated section based on the position information and the design information, calculate a direction in which the distance between the current position and the designated section approximates zero, and guide a worker in the direction in which the distance approximates zero.

5. The surveying assistance device according to claim 1, wherein the processor is configured to calculate a longitudinal gradient based on the design information;

compare a preset longitudinal gradient threshold value and the calculated longitudinal gradient; and issue a warning in a case where the longitudinal gradient is larger than the threshold value.

6. A surveying assistance system comprising:

a position acquiring device including a survey device and a surveyed device that acquires the current position of the surveyed device; and the surveying assistance device according to claim 1, wherein the surveying assistance device is configured to capable of communicate with the position acquiring device to acquire the position information of the surveyed device.

7. The surveying assistance system according to claim 6 wherein the survey device of the position acquiring device is a total station survey device and the surveyed device includes a light-reflective target.

8. The surveying assistance system according to claim 6 wherein the survey device of the position acquiring device is a GNSS survey device capable of communicating with the surveying assistance device such that the surveyed device is the surveying device.

9. A surveying assistance method performed by a computer including a processor, a memory, a screen, and a storage, the method comprising:

reading design information including center point data of a center point set on a centerline of a route, and constituent point data of constituent points set on a section including the center point, the section being orthogonal to the centerline;

acquiring position information indicating a current position of a surveyed device with a predetermined period;

creating a plan view from the design information and displaying the plan view on the screen of the computer;

displaying the current position of the surveyed device on the plan view and updating a display of the current position every time the position information is acquired;

recording acquired position information in the storage as observation data; and displaying reference lines indicating positions which are distant from the designated section backward and forward in a route direction by a preset distance limit on the plan view.

10. The surveying assistance method according to claim 9, wherein the computer further performs the steps of:

calculating a distance between the current position of the surveyed device and the designated section based on the position information and the design information;

comparing the distance with the distance limit; and in a case where the distance exceeds the distance limit, issuing a warning that the surveyed device is distant from the designated section while exceeding the distance limit.

11. The surveying assistance method according to claim 9, wherein the computer further performs the steps of:

calculating a distance between the current position of the surveyed device and the designated section based on the position information and the design information, comparing the distance with the distance limit, and in a case where the distance exceeds the distance limit, refraining from storing the position information in the storage as the observation data.

12. The surveying assistance method according to claim 9, wherein the computer further performs the steps of:

calculating a distance between the current position of the surveyed device and the designated section based on the position information and the design information, calculating a direction in which the distance between the current position and the designated section approximates zero, and guiding a worker in the direction in which the distance approximates zero.

13. The surveying assistance method according to claim 9, wherein the computer further performs the steps of:

calculating a longitudinal gradient based on the design information;

comparing a preset longitudinal gradient threshold value and the calculated longitudinal gradient; and issuing a warning in a case where the longitudinal gradient is larger than the threshold value.

14. A non-transitory computer-readable storage medium comprising a surveying assistance program that instructs a computer to:

read design information including center point data of a center point set on a centerline of a route, and constituent point data of constituent points set on a cross-section including the center point, the cross-section being orthogonal to the centerline;

acquire position information indicating a current position of a surveyed device with a predetermined period;

create a plan view from the design information and display the plan view on a screen of the computer;

display the current position on the plan view and update a display of the current position every time the position information is acquired; and record acquired position information in a storage of the computer as a measurement value of a point on a designated section, wherein the surveying assistance program makes the computer:

display reference lines indicating positions which are 5 distant from the designated section backward and forward in a route direction by a preset distance limit on the plan view displayed on the screen.

<div align="center">* * * * *</div>